United States Patent
Misaki et al.

(10) Patent No.: US 7,665,563 B2
(45) Date of Patent: Feb. 23, 2010

(54) SWING ARM SUPPORTING STRUCTURE FOR MOTORCYCLES

(75) Inventors: Kenichi Misaki, Saitama (JP); Yuzuru Ishikawa, Saitama (JP); Atsuhiko Takahashi, Saitama (JP); Masakazu Kadota, Saitama (JP); Atsushi Takasaki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 580 days.

(21) Appl. No.: 11/327,392

(22) Filed: Jan. 9, 2006

(65) Prior Publication Data

US 2006/0151226 A1 Jul. 13, 2006

(30) Foreign Application Priority Data

Jan. 11, 2005 (JP) ............................. 2005-004151
Jan. 21, 2005 (JP) ............................. 2005-013921

(51) Int. Cl.
*B62K 11/00* (2006.01)
*B62D 61/02* (2006.01)

(52) U.S. Cl. .................................................. 180/227
(58) Field of Classification Search .................. 180/227
See application file for complete search history.

(56) References Cited

U.S. PATENT DOCUMENTS 6,427,796 B1 * 8/2002 Tsutsumikoshi ............ 180/227

2002/0020985 A1 2/2002 Nakagawa
2002/0027034 A1 3/2002 Tsutsumikoshi

FOREIGN PATENT DOCUMENTS

JP 64-85888 A 3/1989
JP 2002-87364 A 3/2002

* cited by examiner

*Primary Examiner*—Lesley Morris
*Assistant Examiner*—Marc A Scharich
(74) *Attorney, Agent, or Firm*—Birch, Stewart, Kolasch & Birch, LLP

(57) ABSTRACT

To restrain an increase in the numbers of components and process steps and achieve an easy mounting and dismounting of a pivot shaft. An arm supporting member includes a pair of left and right plate members, a middle cross pipe extending between the plate members and a center pivot plate mounted to the middle cross pipe. A pivot shaft is supported by the plate member and the center pivot plate, and a drive shaft is arranged between the plate member and the center pivot plate. The middle cross pipe is arranged above the pivot shaft on a front portion of a vehicle. The center pivot plate is provided with an upright wall as a receiving portion for aiding the positioning of the bearing member by receiving the bearing member, more specifically, the collar when assembling the swing arm to the center pivot plate and the plate member.

20 Claims, 12 Drawing Sheets

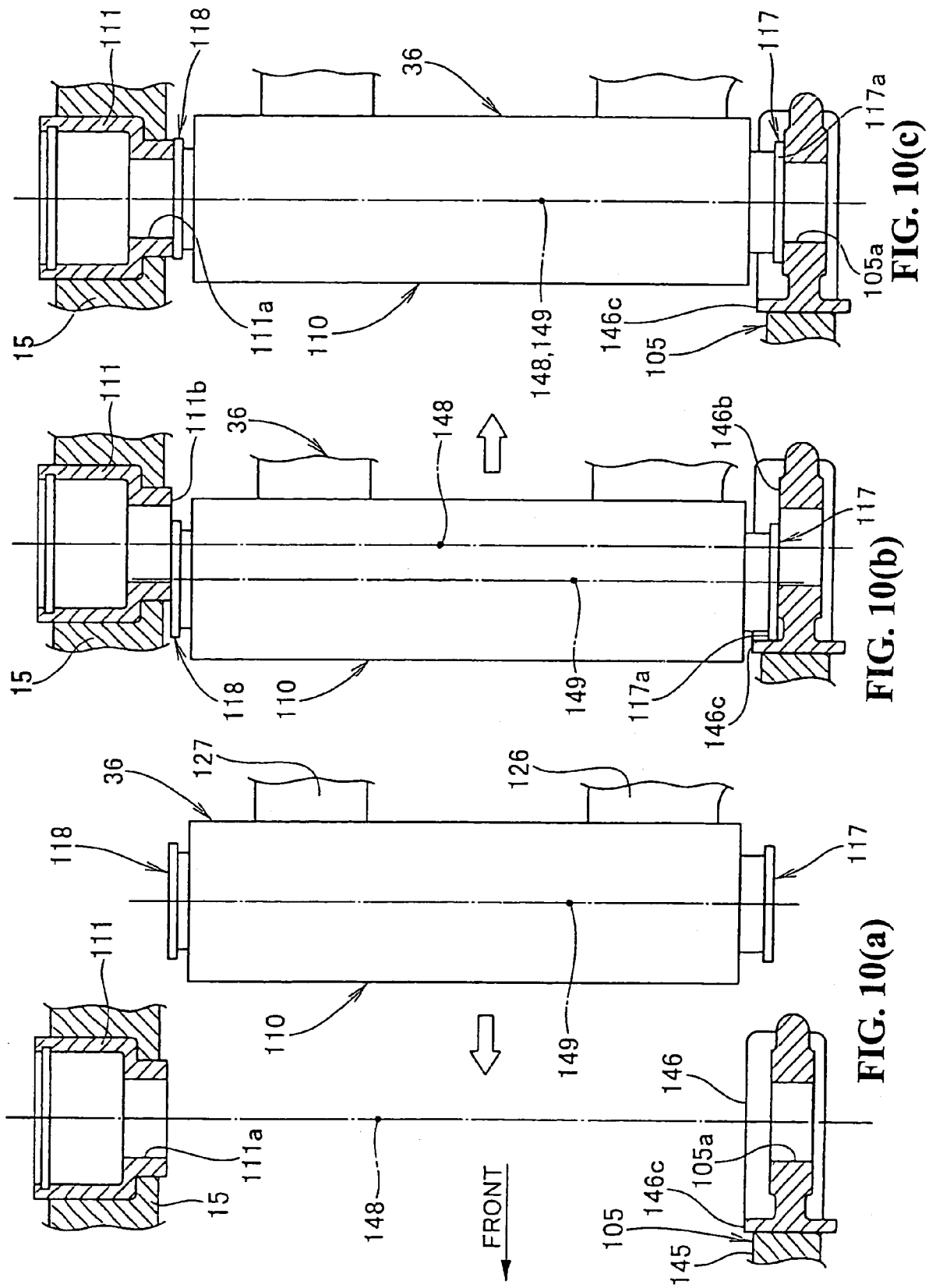

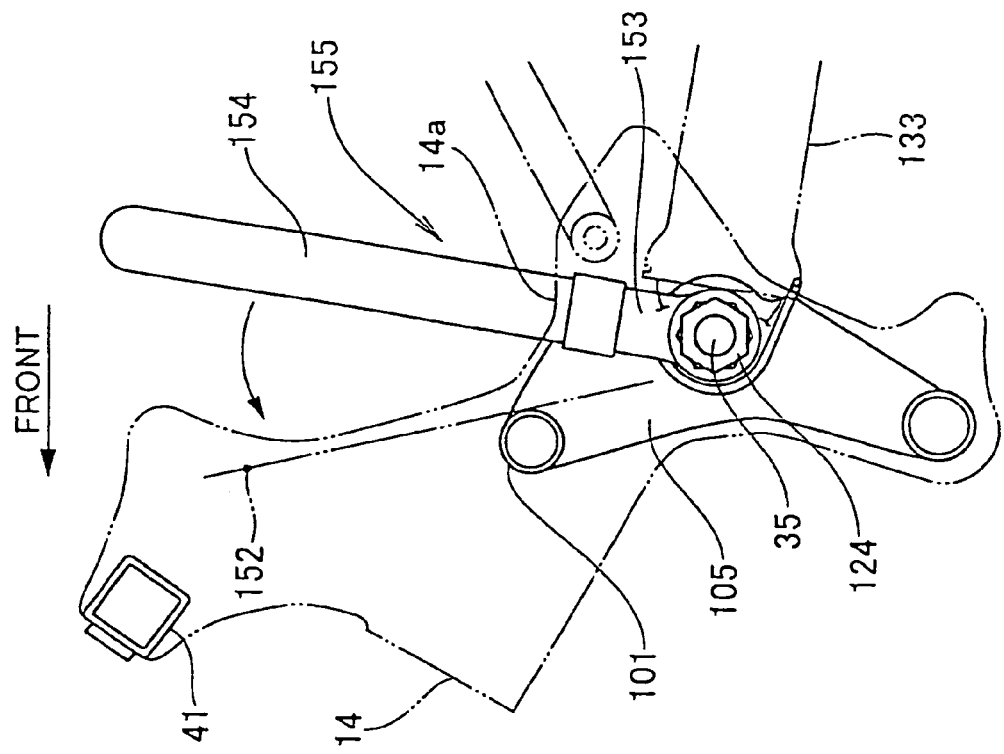
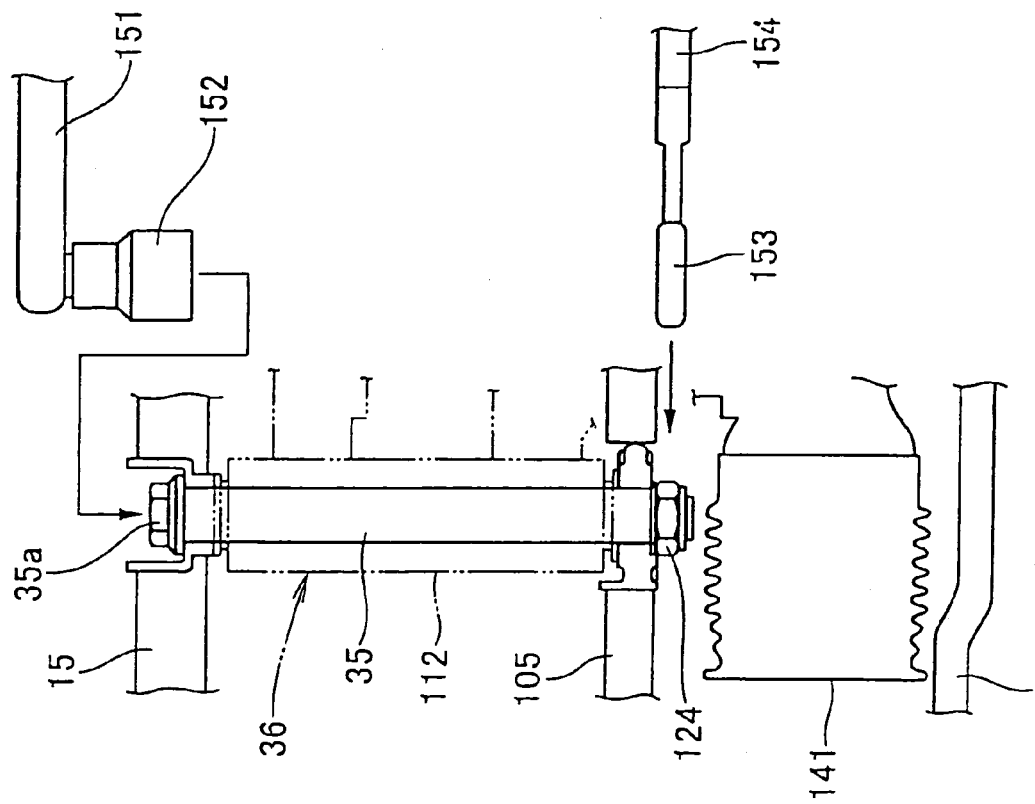
FIG. 12(b)
FIG. 12(a)

SWING ARM SUPPORTING STRUCTURE FOR MOTORCYCLES

CROSS-REFERENCE TO RELATED APPLICATIONS

The present application claims priority under 35 USC 119 to Japanese Patent Application No. 2005-004151 filed on Jan. 11, 2005 and Japanese Patent Application No. 2005-013921 filed on Jan. 21, 2005 the entire contents of which are hereby incorporated by reference.

FIELD OF THE INVENTION

The present invention relates to an improved swing arm supporting structure for a motorcycle.

DESCRIPTION OF BACKGROUND ART

A swing arm supporting structure for a motorcycle is known wherein a pivot shaft for mounting a rear arm as a swing arm to a rear portion of a vehicle frame is arranged on a side of a drive shaft for transmitting power to a rear wheel. See, for example, JP-A-2002-87364.

FIG. 3 and FIG. 4 in JP-A-2002-87364 will be described below. Reference numerals used hereinafter are the same reference numerals as set forth in JP-A-2002-87364.

FIG. 4 in JP-A-2002-87364 illustrates a state wherein rear arm brackets 7 are mounted to a pair of left and right main frames 6, 6 with a pivot shaft 10 is mounted to left and right frame portions 7e, 7f extending downwardly from upper joint portions 7c of the rear arm brackets 7. A rear arm 14 is swingably mounted to the pivot shaft 10 with a universal joint portion 42 of a drive shaft being provided for transmitting power to a rear wheel. The universal joint portion 42 is arranged in a recess 7b of the rear arm bracket 7, and the universal joint portion 42 and the pivot shaft 10 are arranged in a direction of the width of the vehicle. A foot rest bracket 70 is provided for covering a side of the recess 7b.

The pivot shaft 10 is formed with a screw portion 10a at one end thereof, a screw portion 10b at the other end thereof. The screw portion 10a is screwed into the frame portion 7e and the screw portion 10b is fixed to the frame portion 7f with a nut 11.

FIG. 3 of 0505-1448PUS1 illustrates a state in which the rear arm brackets 7 are substantially aligned one above another. The universal joint portion 42 connected to a front end of the drive shaft 43 is positioned on the side of the rear arm brackets 7, and shock absorbers 28 are mounted across upper portions of the rear arm brackets 7 with links 22 mounted to lower ends of the rear arm brackets 7.

A swing arm supporting structure for a motorcycle in the related art is known wherein a rear arm is provided for supporting a rear wheel to a rear arm bracket on a vehicle body frame side via a pivot shaft. See, for example, JP-A-2002-87364.

FIG. 4 of JP-A-2002-87364 illustrates a structure in which a pivot shaft 10 is mounted to left and right frame portions 7e, 7f provided on a rear arm bracket 7. A front end portion of a rear arm 14, that is, a cylindrical head portion 14c is supported by the pivot shaft 10.

When the rear arm 14 is mounted to the rear arm bracket 7, the head portion 14c of the rear arm 14 is inserted between the frame portions 7e, 7f of the rear arm bracket 7, and the pivot shaft 10 is inserted into a mounting hole on the frame portion 7f, a pivot shaft insertion hole 14d of the head portion 14c, and a female screw of the frame portion 7e in sequence.

In JP-A-2002-87364, the frame portion 7e of the rear arm bracket 7 is formed with a female screw for receiving the screw portion 10a of the pivot shaft 10 screwed therein. However, since the foot rest bracket 70 is adapted to be detachably attached to the rear arm bracket 7 in order to form the female screw, the foot rest bracket 70 itself and a plurality of bolts are added for mounting the foot rest bracket 70 to the rear arm bracket 7. Thus, the number of components is increased in comparison with the foot rest bracket provided integrally with the rear arm bracket. In addition, the number of process steps for forming a bolt insertion hole for passing or screwing the bolt therein and the female screw is increased.

Therefore, by employing a structure in which a simple bolt insertion hole for passing the screw portion 10a at one end of the pivot shaft 10 is formed on the frame portion 7e from the frame 7f side so that the nut is screwed into the screw portion 10a passed through the bolt insertion hole instead of forming the female screw on the frame portion 7e, the foot rest bracket 70 can be formed integrally with the rear arm bracket 7.

However, since the upper connecting portion 7c of the rear arm bracket 7 is located above the pivot shaft 10, and the shock absorber 28 is located behind the pivot shaft 10 in the vicinity of the rear arm 14 or the rear arm bracket 7. Thus, it is difficult to rotate the nut and screw in the screw portion 10a or to insert a tool for rotating and removing the nut to a position of the nut on the pivot shaft 10 side. In addition, it is further difficult to rotate the nut with the tool.

SUMMARY AND OBJECTS OF THE INVENTION

It is an object of the present invention to restrain an increase in the number of components and enable an easy mounting and dismounting of the pivot shaft by improving the swing arm supporting structure in a motorcycle.

In order to insert the pivot shaft 10, which is inserted into the mounting hole on the above-described frame portion 7f, into the pivot shaft insertion hole 14d and the female screw on the frame portion 7e, it is necessary to align the pivot shaft insertion hole 14d with the mounting hole on the frame portion 7f and the female screw of the frame portion 7e. However, since the head portion 14c or the frame portions 7e, 7f are not provided with a structure for positioning them with respect to each other, they are difficult to position, which makes the mounting work of the rear arm 14 to the rear arm bracket 7 difficult.

It is an object of the present invention to improve the swing arm supporting structure for a motorcycle for achieving an easy assembly of the swing arm.

An embodiment of the present invention is directed to a motorcycle including an arm supporting member provided on a rear portion of a vehicle body frame with a swing arm mounted to the arm supporting member via a pivot shaft. The pivot shaft is arranged with a drive shaft for transmitting power to a rear wheel mounted to a rear end of the swing arm in a side-by-side relation in a direction of the width of a vehicle. The arm supporting member includes a pair of left and right plate members, a cross pipe extending between the plate members, and a center plate member mounted to the cross pipe. The pivot shaft is supported by one of the plate members and the center plate member with the drive shaft being arranged between the other plate member and the center plate member. The cross pipe is arranged above the pivot shaft and on a front portion of the vehicle.

By arranging the cross pipe above the pivot shaft and forwardly of the vehicle, a space for fixing one end of the pivot shaft to the center plate member, for example for inserting a tool for rotating a nut and pivoting the same therein, is defined above the pivot shaft. Since the one end of the pivot shaft inserted from the side of one of the plate members is mounted to the center plate member with the nut, the entire part of the other plate member can be integrated.

An embodiment of the present invention is directed to the other plate member that is preferably a member formed with a notch at a portion located above the pivot shaft.

By forming the notch at the portion of the other plate member located above the pivot shaft, the space for inserting the tool from above the pivot shaft for pivotal movement is further increased. Accordingly, the tool can easily be inserted toward the nut, and the tool can easily be engaged with the nut. Moreover, pivotal movement of the tool for rotating the nut is facilitated.

An embodiment of the present invention is directed to a rear shock absorber mounting portion provided on the arm supporting member that is preferably arranged above the cross pipe and on the front portion of a vehicle body.

By arranging the rear shock absorber mounting portion above the cross pipe and on the front portion of the vehicle body, the space for inserting the tool from above the pivot shaft for pivotal movement is further increased. Accordingly, the operations such as inserting the tool toward the nut, engaging the tool with the nut, or pivoting the tool for rotating the nut are further facilitated.

An embodiment of the present invention is directed to the other plate member being preferably arranged to a side of the pivot shaft with respect to the vehicle body so as to hide the pivot shaft from the eye.

Since the other plate member has no opening, the rigidity of the other plate member is increased.

An embodiment of the present invention is directed to the other plate member that is preferably mounted integrally with a frame member constituting the vehicle body frame.

By mounting the other plate member integrally with the frame member, the rigidity of the other plate member can be secured.

An embodiment of the present invention is directed to the cross pipe being arranged above the pivot shaft and on the front portion of the vehicle. Thus, the space for inserting the tool for pivotal movement can be defined above the pivot shaft. Hence, for example, the nut for mounting the pivot shaft to the center plate can be easily rotated by the tool, and easy mounting and dismounting of the pivot shaft are enabled. Therefore, since the entire plate member can be integrally formed, the number of components and process steps are not increased, whereby an increase in cost may be prevented.

An embodiment of the present invention is directed to the notch being formed on the other plate member at the portion located above the pivot shaft. Thus, the tool can easily be inserted toward, for example, the nut from above the pivot shaft, and the tool can easily be engaged from the nut. Moreover, the operation of the tool for rotating the nut can be facilitated, whereby the workability is improved.

An embodiment of the present invention is directed to the rear shock absorber mounting portion provided on the arm supporting member that is arranged above the cross pipe and on the front portion of the vehicle body. Thus, the tool can easily be inserted toward, for example, the nut from above the pivot shaft, and the tool can easily be engaged with the nut. Moreover, the operation of the tool for rotating the nut can be facilitated, whereby the workability is further improved.

An embodiment of the present invention is directed to the other plate member being arranged on the side of the pivot shaft with respect to the vehicle body so as to hide the pivot shaft from the eye, the other plate member can be configured without an opening. Thus, the rigidity of the other plate member can be increased.

An embodiment of the present invention is directed to the other plate member being mounted integrally to the frame member. The pivot shaft is hidden from the eye by the other plate member and the rigidity of the other plate member can be secured by being mounted integrally to the frame member. Thus, the rigidity of the entire arm supporting member can be increased.

An embodiment of the present invention is directed to a motorcycle including left and right pivot plates on a vehicle body frame with a bearing member provided at a front end of a swing arm for supporting a rear wheel so as to be capable of swinging in the vertical direction. The bearing member is mounted to the pivot plate via a pivot shaft wherein a receiving portion is provided on the pivot plate for aiding the positioning of the baring member by receiving the baring member when assembling the swing arm to the pivot plate.

When assembling the swing arm to the pivot plate, the bearing member provided on the front end of the swing arm is received by the receiving portion provided on the pivot plate for aiding the positioning of the bearing member. A pivot shaft insertion hole on the bearing member side is aligned with a pivot shaft insertion hole on the pivot plate side. Thus, the pivot shaft may be inserted into the pivot shaft insertion holes.

An embodiment of the present invention is directed to a motorcycle wherein a shaft-drive type rear-wheel drive vehicle and the receiving portion are provided on the pivot plate on a drive shaft side.

In the shaft-drive type rear-wheel drive vehicle having the drive shaft on an outer side of one of the left and right pivot plates, by providing the receiving portion on the pivot plate on the side of the drive shaft, the positioning of the swing arm with respect to the pivot plate inside the vehicle is facilitated.

An embodiment of the present invention is directed to the receiving portion that receives a flange portion of a collar provided at an end of the bearing member.

The receiving portion receives the flange portion positioned in a gap between the pivot plate and the bearing member. The position of the flange portion can easily be identified, whereby movement of the pivot plate to a predetermined position is facilitated.

An embodiment of the present invention is directed to the receiving portion that extends upright substantially along the pivot shaft and is formed into an upright wall surrounding an end of the pivot shaft.

The receiving portion extends upright substantially along the pivot shaft by, for example, being formed integrally with a base portion of the pivot plate, and is formed into the upright wall surrounding the end of the pivot shaft, so as to facilitate the formation of the receiving portion.

An embodiment of the present invention is directed to the receiving portion that is provided at least on a front side of the pivot shaft with respect to the vehicle.

The receiving portion is provided at least on the front side of the pivot shaft with respect to the vehicle so that a rear side of the pivot shaft is opened with respect to the vehicle, and the bearing member of the swing arm is moved from the back side of the vehicle between the left and right pivot plates on the front side of the vehicle, whereby the bearing member is received by the receiving portion.

An embodiment of the present invention is directed to the pivot plate being a member including a plate member and a shaft supporting member formed separately from the plate member for forming the receiving portion combined with respect to each other.

The pivot plate includes the plate member and the shaft supporting member provided with the receiving portion, and for example, the plate member and the shaft supporting member formed of different materials as different members are combined.

An embodiment of the present invention is directed to the receiving portion being provided on the pivot plate for aiding the positioning of the baring member by receiving the baring member when assembling the swing arm to the pivot plate, the receiving portion can aid the positioning of the receiving portion of the swing arm, whereby the swing arm can easily be assembled to the pivot plate.

An embodiment of the present invention is directed to a motorcycle wherein the shaft-drive type rear-wheel drive vehicle, and the receiving portion are provided on the pivot plate on the side of the drive shaft. Thus, the assembly of the swing arm to the pivot plate located nearer to a center of the vehicle body is facilitated, whereby the assembleability is improved.

An embodiment of the present invention is directed to the receiving portion that receives the flange portion of the collar provided at the end of the bearing member. The flange portion of the collar can easily be identified even in the narrow gap between the pivot plate and the bearing member, whereby positioning of the bearing member is facilitated.

An embodiment of the present invention is directed to the receiving portion being formed into the upright wall wherein the receiving portion can be formed without providing an additional component. Thus, an increase in the number of components can be prevented.

An embodiment of the present invention is directed to the receiving portion being provided at least on the front side of the pivot shaft with respect to the vehicle. The positioning can be aided by bringing the bearing member of the swing arm into abutment with the receiving portion from behind the vehicle. Thus, the assembleability of the swing arm from behind the vehicle is improved.

An embodiment of the present invention is directed to the pivot plate that is the member including the plate member and the shaft supporting member formed separately from the plate member for forming the receiving portion combined with respect to each other, for example, the shaft supporting member provided with the receiving portion can be formed of different material from the plate member, whereby the flexibility of the design of the pivot plate is increased.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 10(a), 10(b) and 10(c) are first operational drawings illustrating an operation of a swing arm supporting structure according to the present invention FIGS. 12(a) and 12(b) are third operational drawings showing the operation of the swing arm supporting structure according to the present invention.

DETAILED DESCRIPTION OF THE PREFERRED EMBODIMENTS

Figure 1:
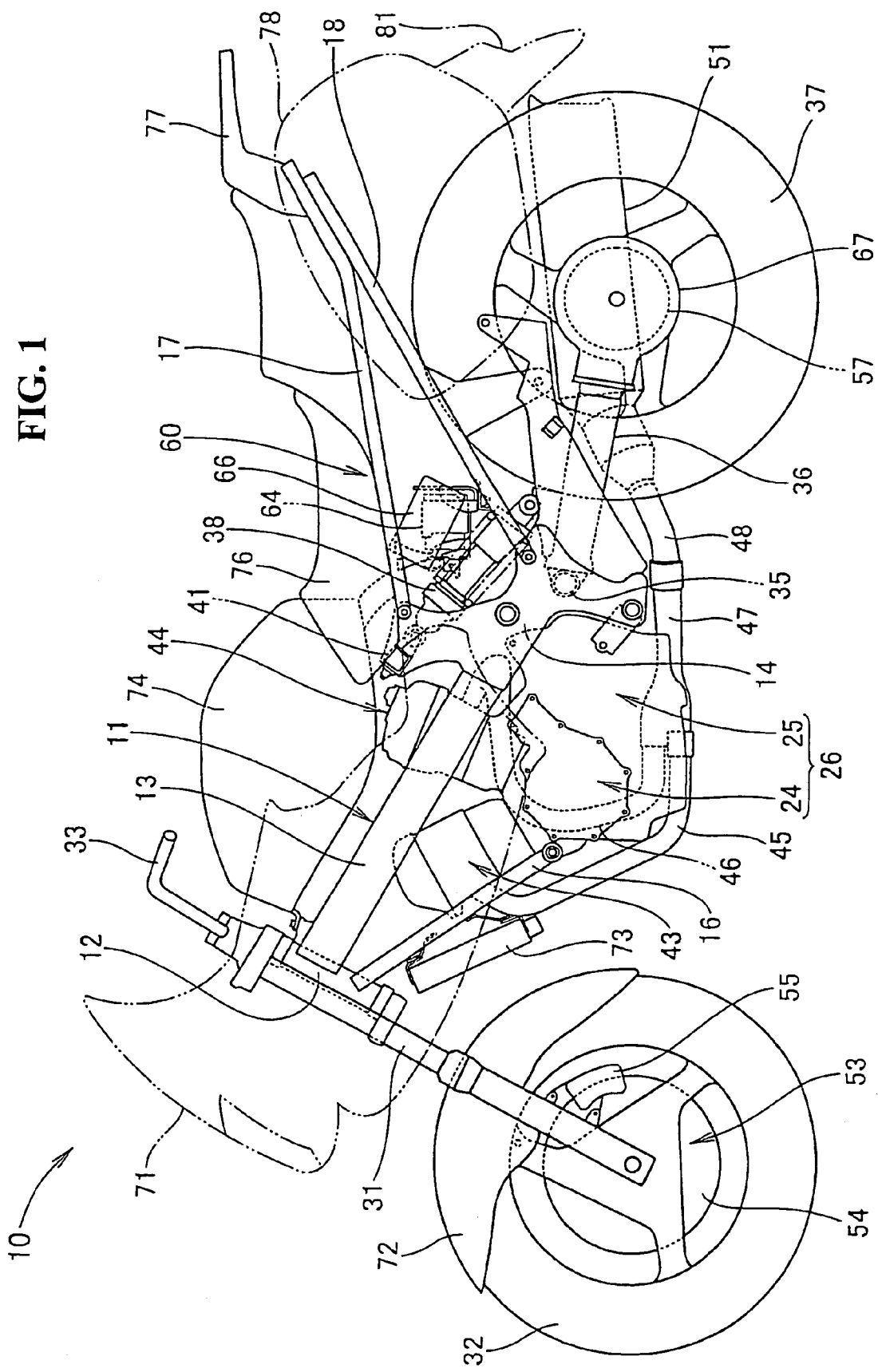
FIG. 1 is a side view of a motorcycle in which a swing arm supporting structure according to the present invention is applied.

Referring to accompanied drawings, a best mode for carrying out the present invention will be described below. The drawings are to be viewed in the orientation in which the reference numerals are viewed in the correct way.

FIG. 1 is a side view of a motorcycle in which a swing arm supporting structure according to the present invention is applied. A motorcycle 10 includes a vehicle body frame 11 including a head pipe 12, a pair of left and right main frames 13, 13 (only the reference numeral 13 on the near side is shown) extending from the head pipe 12 rearwardly and obliquely downwardly with a pair of left and right plate members 14, 15 (only the reference numeral 14 on the near side is shown) being mounted to rear ends of the main frames 13, 13. A pair of left and right down frames 16, 16 (only the reference numeral 16 on the near side is shown) are provided that extend from the head pipe 12 rearwardly and obliquely downwardly below the main frames 13, 13 with a pair of seat rails 17, 17 (only the reference numeral 17 on the near side is shown) extending rearwardly from upper portions of the plate members 14, 15. Sub frames 18, 18 (only the reference numeral 18 on the near side is shown) are mounted so as to extend respectively between rear portions of the seat rails 17, 17 and rear portions of the plate members 14, 15. A power unit 26 including an engine 24 and a transmission 25 are mounted to the plate members 14, 15 and the down frames 16, 16.

The head pipe 12 is mounted so as to be capable of steering a front fork 31. A front wheel 32 is mounted to a lower end of the front fork 31 with a bar handle 33 being mounted to an upper end of the front fork 31.

The plate member 15 on the far side is a pivot plate on which a swing arm 36 is mounted via a pivot shaft 35 with the swing arm 36 being a member having a rear wheel 37 mounted to a rear end thereof. A drive shaft is provided for transmitting power from the transmission 25 to the rear wheel 37 accommodated in a hollow portion thereof. A rear shock absorber 38 is mounted between the swing arm 36 and the plate members 14, 15 side. More specifically, an upper cross pipe 41 extends between the left and right plate members 14, 15.

The engine 24 is a two-cylinder V-type engine that includes exhaust pipes 45, 46 extending downwardly from a front cylinder 43 and a rear cylinder 44, respectively. A muffler 51 is connected to the exhaust pipes 45, 46 via a collective pipe 47 and a rear exhaust pipe 48.

The front wheel 32 is provided with a front disk brake device 53 attached thereto, and the front disk brake device 53 includes a brake disk 54 integrally mounted to the front wheel 32, and a brake caliper 55 mounted to the front fork 31 for clamping the brake disk 54 and for putting a brake thereon.

The rear wheel 37 includes a rear disk brake device 57 attached thereto, and the rear disk brake device 57 includes a brake disk (not shown) arranged on the right side of the rear wheel 37, and a brake caliper (not shown) mounted to the swing arm 36.

The front disk brake device 53 and the rear disk brake device 57 described above are connected to an anti-lock brake system 60 (hereinafter, simply referred to as "ABS 60"), and the ABS 60 includes a modulator 64 for increasing and reducing hydraulic pressure for applying a braking action by the front disk brake device 53 and the rear disk brake device 57 based on control signals from a control unit, not shown. A battery 66 is arranged on a side (near side) of the modulator 64 with a gear case 67 being connected to a rear end on the left side of the swing arm 36 for accommodating a pair of bevel gears meshed with each other and provided between the drive shaft and the rear wheel 37.

A front cowl 71 is provided together with a front fender 72, a radiator 73 and a fuel tank 74. A seat 76 is mounted to the left and right seat rails 17, 17, with a grab rail 77 being provided to the rear. Rear side luggage boxes 78, 78 (only the reference numeral 78 on the near side is shown) are provided together with a rear fender 81.

Figure 2:
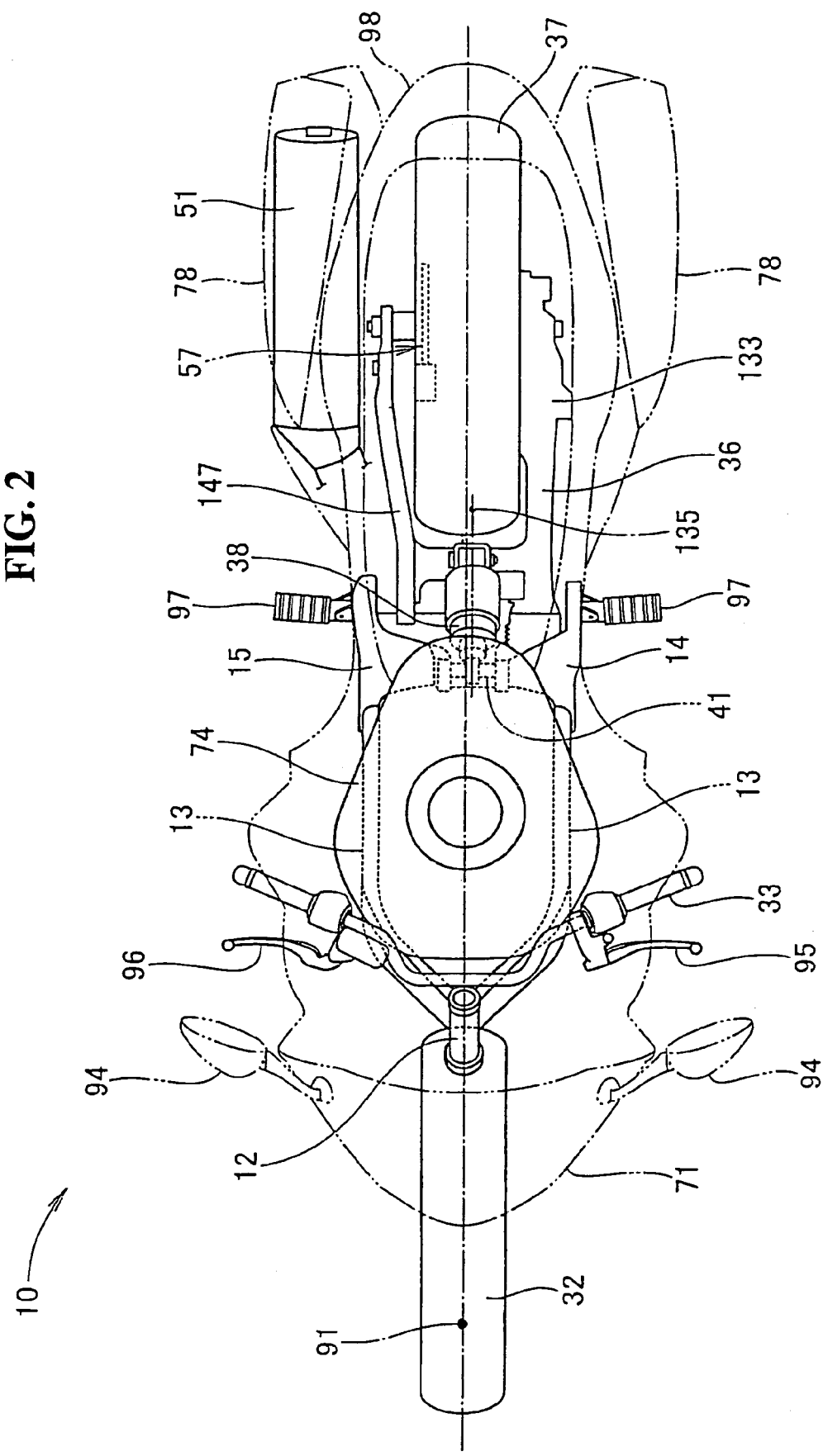
FIG. 2 is a plan view of the motorcycle according to the present invention.

FIG. 2 is a plan view of the motorcycle according to the present invention, illustrating that the plate members 14, 15 (only the reference numeral 14 on the near side is shown) being mounted to the rear ends of the pair of left and right main frames 13, 13 respectively. The swing arm 36 is mounted to one of the plate member 15 and a member described later via the pivot shaft. An end of the rear shock absorber 38 is mounted to the upper cross pipe 41 extending between the plate members 14, 15, and the other end of the rear shock absorber 38 is mounted to the swing arm 36.

Rear view mirrors 94, 94 are mounted on the vehicle. A clutch lever 95 is provided with a front wheel brake lever 96. Driver's steps 97, 97 are provided together with a rear vehicle body cover 98. A shift pedal and a brake pedal for the rear wheel are not shown in the drawing.

Figure 3:
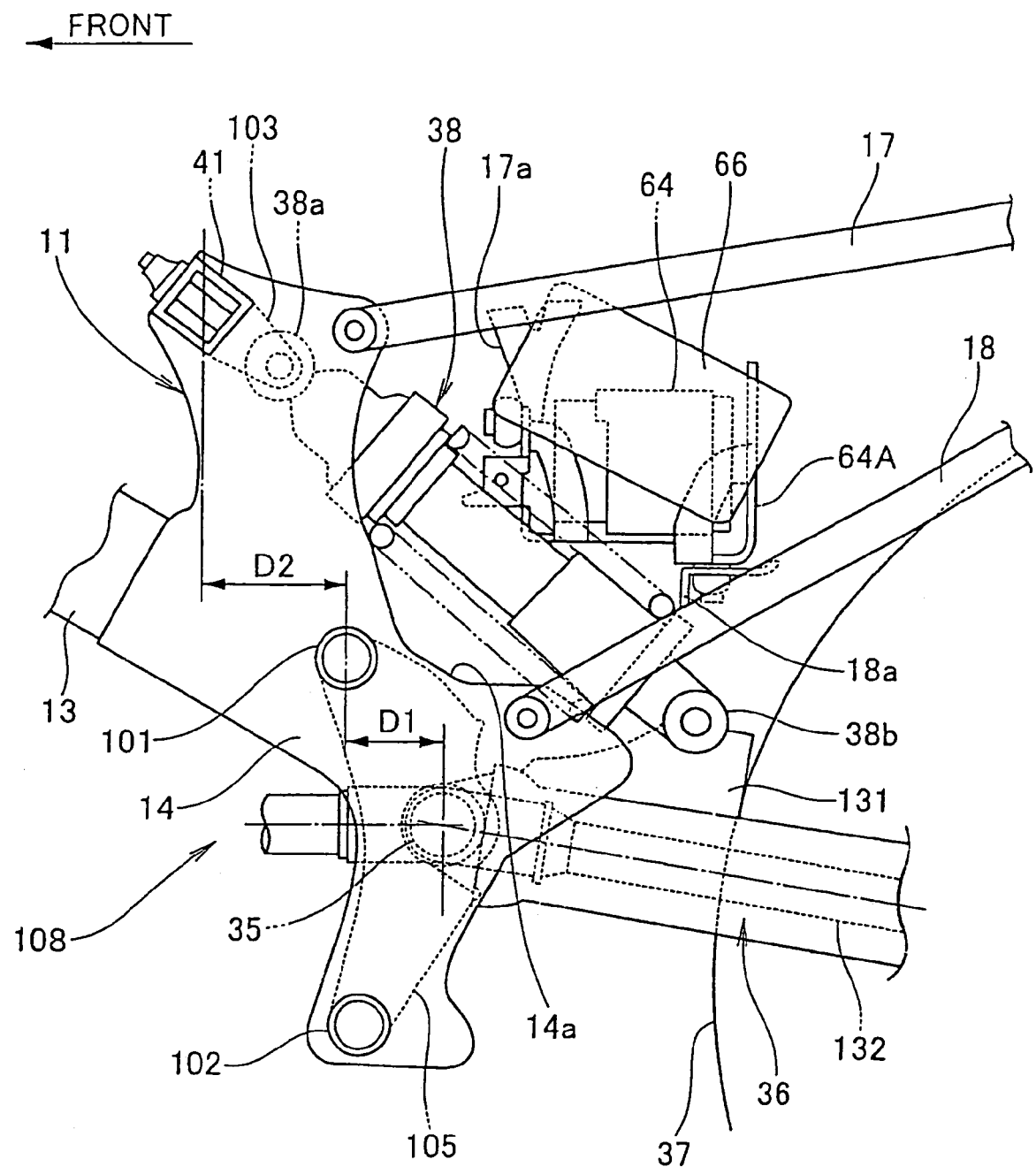
FIG. 3 is a side view of a principal portion of the motorcycle according to the present invention.

FIG. 3 is a side view of a principal portion of the motorcycle (an arrow (FRONT) in the drawing represents the front of the vehicle, hereinafter) according to the present invention. The plate members 14, 15 (only the reference numeral 14 on the near side is shown) are connected by an upper cross pipe 41, a middle cross pipe 101, and a lower cross pipe 102. One of the plate members 14 is a member formed with a notch 14a at a portion located above the pivot shaft 35.

The middle cross pipe 101 is a member arranged above the pivot shaft 35 at a distance D1 apart therefrom toward the front of the vehicle, and the upper cross pipe 41 is a member arranged above the middle cross pipe 101 at a distance D2 apart therefrom toward the front portion of the vehicle.

An upper bracket 17a is mounted to the seat rail 17 with a lower bracket 18a being mounted to the sub frame 18. An upper end 38a and a lower end 38b of the rear shock absorber 38 are secured to the frame. A supporting bracket 64A is provided for supporting the modulator 64 to be mounted to the upper bracket 17a and the lower bracket 18a via a rubber. A cushion upper end supporting bracket 103 is provided for mounting the upper end 38a of the rear shock absorber 38 to the upper cross pipe 41.

Figure 4:
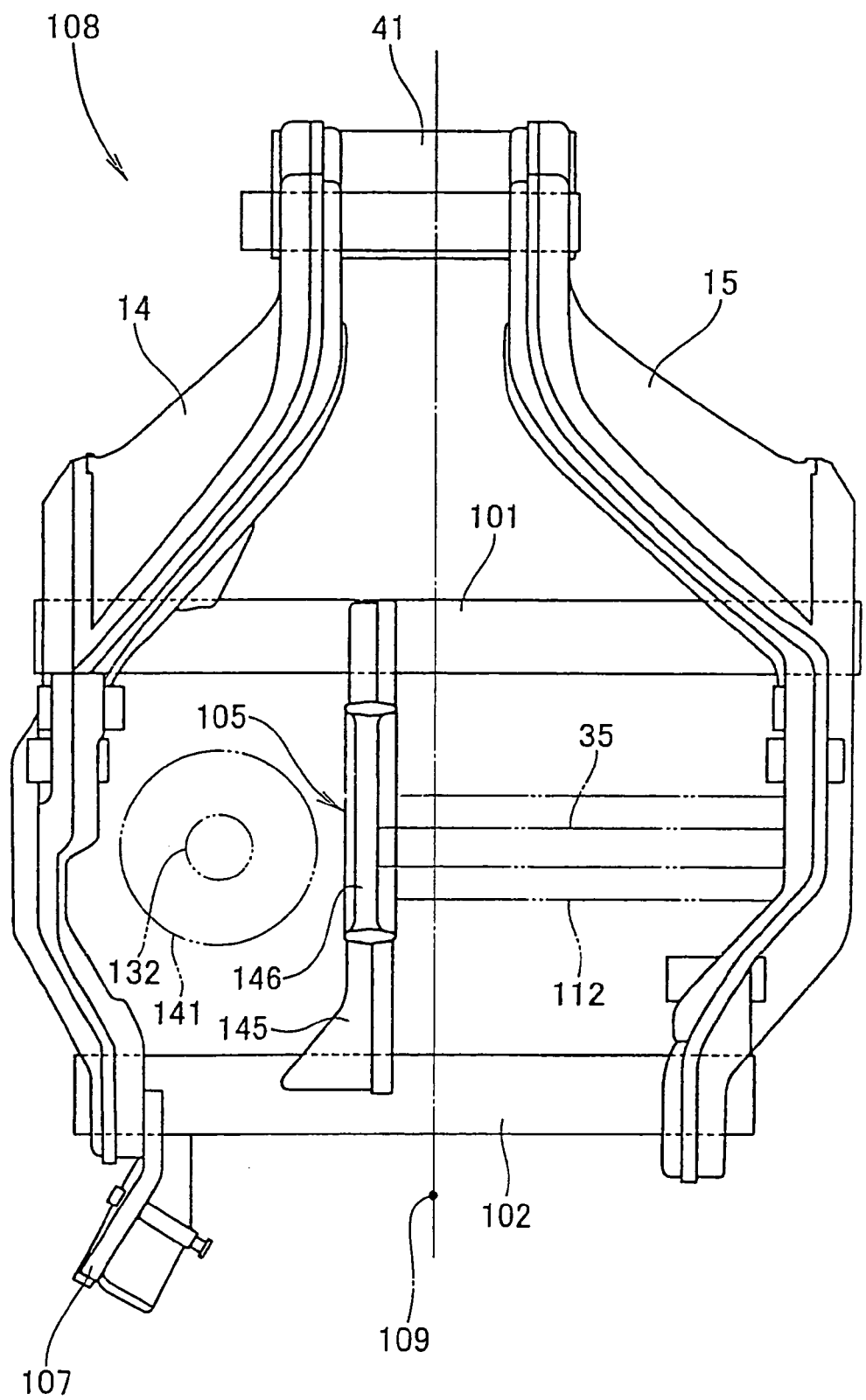
FIG. 4 is a back view for explaining an arm supporting member for supporting a swing arm according to the present invention.

FIG. 4 is a back view for explaining the plate member according to the present invention, illustrating that the left and right plate members 14, 15 are connected by the upper cross pipe 41, the middle cross pipe 101, and the lower cross pipe 102. A center pivot plate 105 is mounted to the midsections of the middle cross pipe 101 and the lower cross pipe 102, respectively. The pivot shaft 35 is mounted to the center pivot plate 105 and the right plate member 15. A stand supporting member 107 is mounted to the plate member 14 and the lower cross pipe 102.

The above described plate members 14, 15, the upper cross pipe 41, the middle cross pipe 101, the lower cross pipe 102, and the center pivot plate 105 are members which constitute an arm supporting member 108 for supporting the swing arm 36 (see FIG. 3), and are also members which constitute part of the vehicle body frame 11 (see FIG. 1). A vertical centerline 109 of the vehicle body is provided which corresponds to the lateral center of the vehicle body extending in the vertical direction, and is positioned on the same vertical surface as a centerline 91 (see FIG. 2) of the vehicle body described above.

Figure 5:
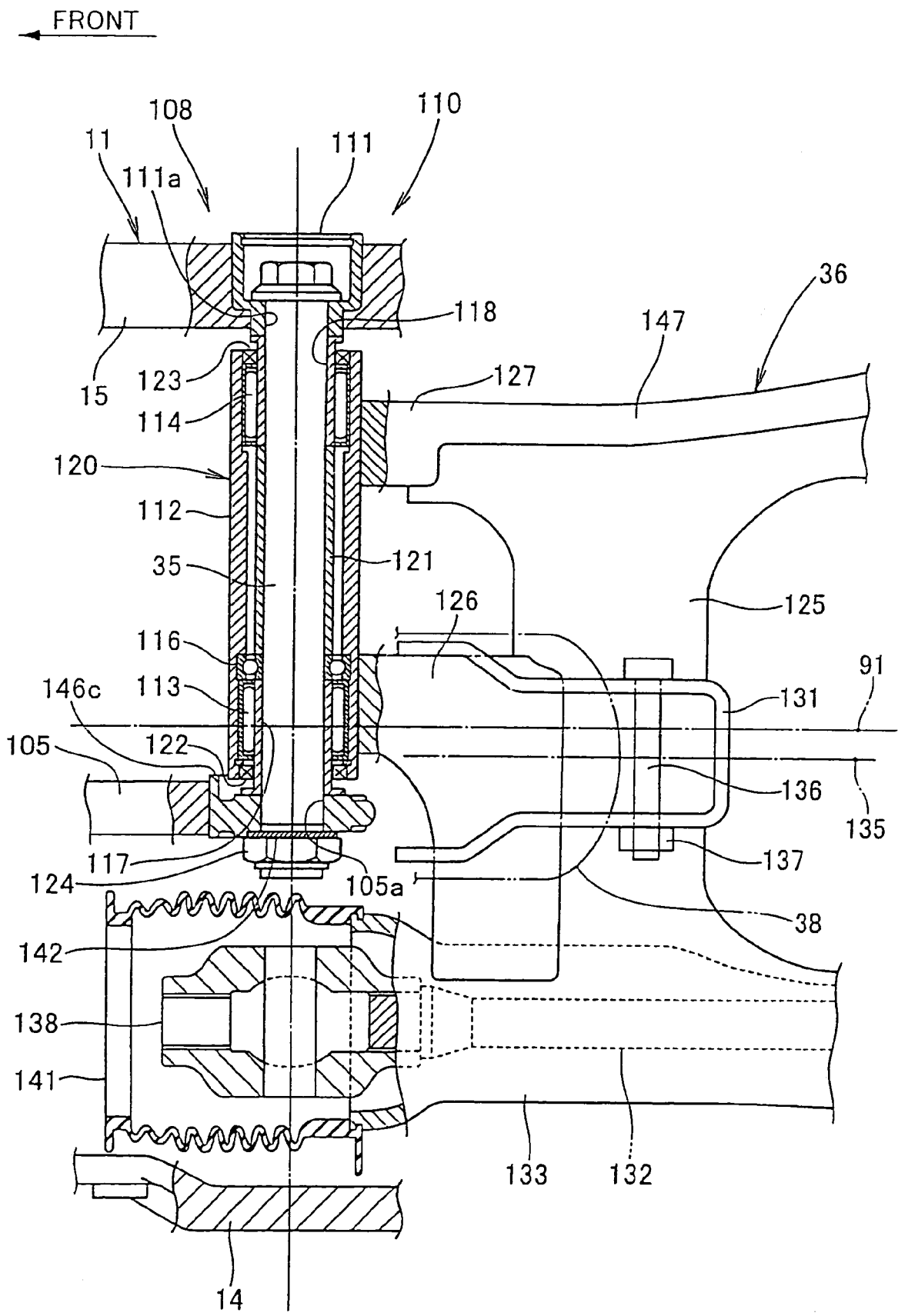
FIG. 5 is a cross-sectional view showing a structure around a pivot shaft according to the present invention.

FIG. 5 is a cross-sectional view showing a structure around the pivot shaft according to the present invention, in which a swing arm supporting portion 110 for supporting the swing arm 36 with respect to the vehicle body frame 11 includes a cylindrical member 111 fitted to the plate member 15, a cylindrical housing 112 mounted to a front end of the swing arm 36, a pair of needle bearings 113, 114 and a ball bearing 116 fitted to the cylindrical housing 112. Collars 117, 118 are fitted inside the respective needle bearings 113, 114 with a collar 121 being interposed between the needle bearing 114 and the ball bearing 116. Sealing members 122, 123 are provided at both ends of the cylindrical housing 112 with a hole 111a formed on the arm 36. The pivot shaft 35 passes through the cylindrical member 111, the collars 118, 121, the ball bearing 116, the collar 117, and a through hole 105a formed on the center pivot plate 105 in sequence. A nut 124 is screwed to a distal end of the pivot shaft 35.

A bearing member 120 for receiving the pivot shaft 35 includes the cylindrical housing 112 described above, the needle bearings 113, 114, the ball bearing 116, collars 117, 118, the collar 121, sealing members 122, 123, and is a portion constituting the front end portion of the swing arm 36.

The swing arm 36 includes a joint portion 125 for connecting the left side and the right side, forward extending portions 126, 127 extending from the joint portion 125 toward the front of the vehicle, a shock absorber lower end supporting bracket 131 mounted between the forward extending portion 126 and the joint portion 125 for connecting the lower end of the rear shock absorber 38, and a cylindrical shaft storage section 133 formed integrally on the left side of the joint portion 125 for storing a drive shaft 132 for transmitting drive force from the transmission 25 (see FIG. 1) to the rear wheel 37 (see FIG. 2).

A centerline 135 of the rear shock absorber 38 in the lateral direction of the vehicle is offset towards the drive shaft 132 with respect to the centerline 91 of the vehicle body. The upper end of the rear shock absorber 38 is connected to the upper cross pipe 41 via the cushion upper end supporting bracket 103, as shown in FIG. 3.

Referring back to FIG. 5, a joint bolt 136 a nut 137 are provided for connecting the rear shock absorber 38 to the shock absorber supporting bracket 131. A joint 138 is provided for connecting the transmission 25 side and the drive shaft 132 on the side of the pivot shaft 35 with respect to the vehicle. A rubber boot 141 covers the joint 138.

Figure 6:
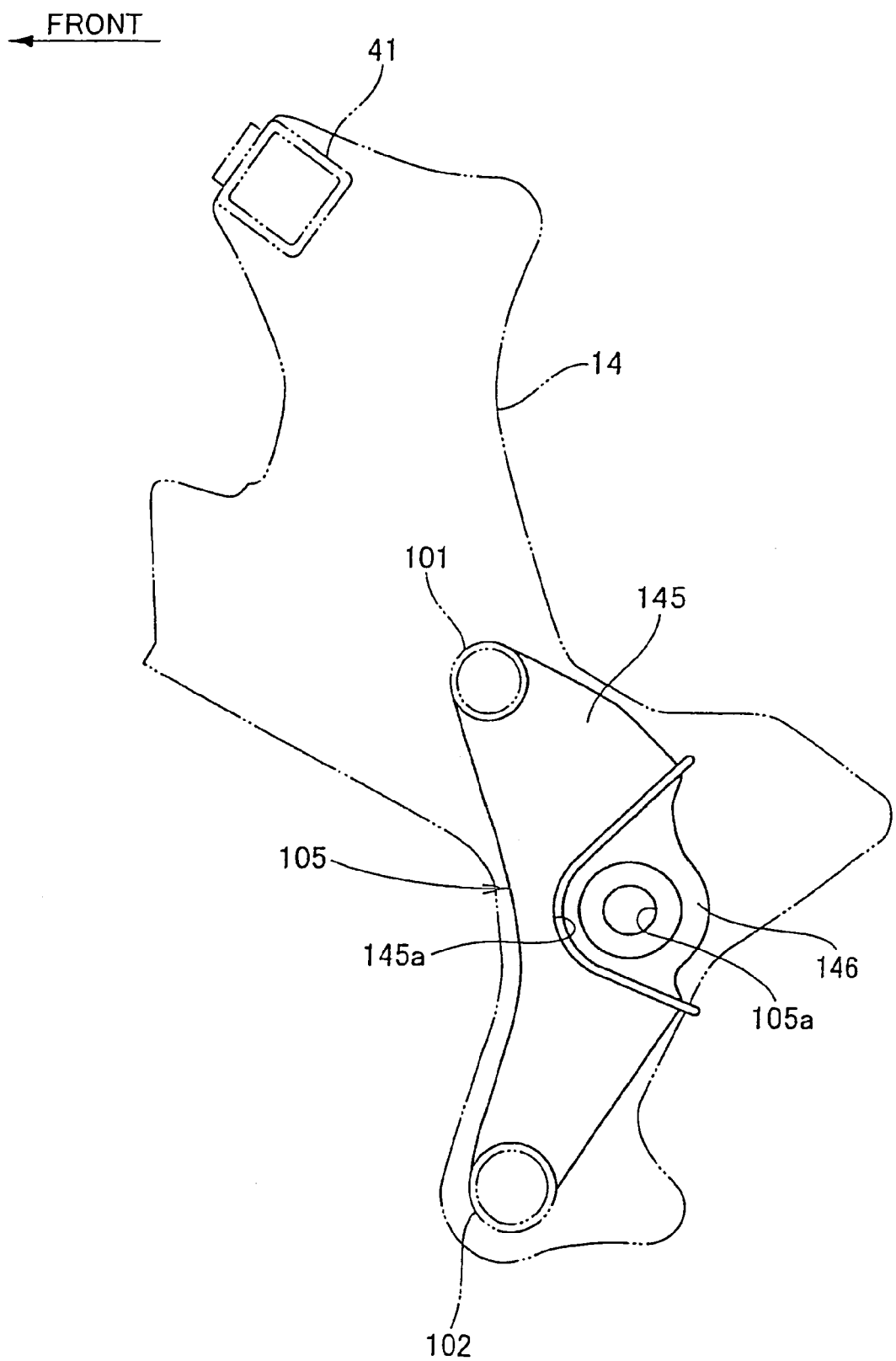
FIG. 6 is a side view of a center pivot plate according to the present invention.

FIG. 6 is a side view of the center pivot plate according to the present invention with the center pivot plate 105 including a plate portion 145 to be mounted to the middle cross pipe 101 and the lower cross pipe 102. A shaft supporting portion 146 is provided for supporting one end of the pivot shaft 35 (see FIG. 5) by being mounted to an angular C-shaped notch 145a formed on the plate portion 145. Since the C-shaped notch 145a is located inside the contour of the plate member 14 in side view, it is completely hidden.

Figure 7A:
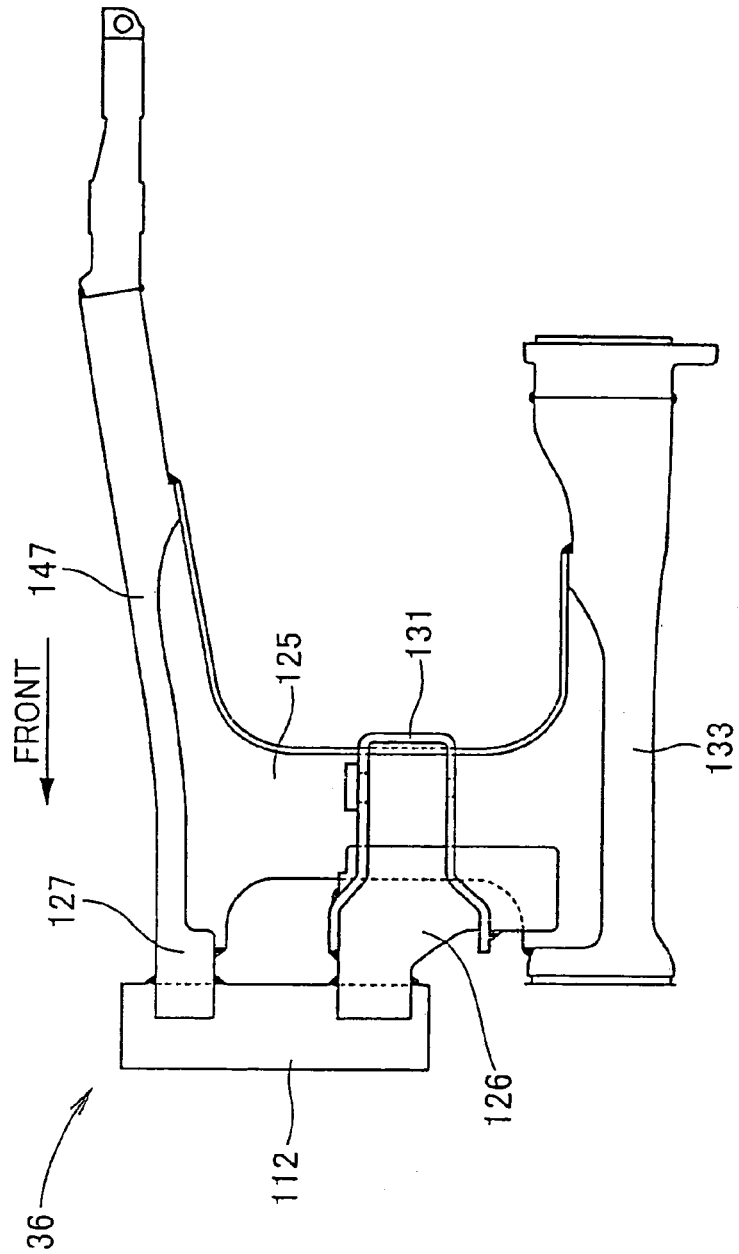
FIGS. 7(a) and 7(b) are explanatory drawings of the swing arm according to the present invention.

FIGS. 7(a), (b) are explanatory drawings of the swing arm according to the present invention.

FIG. 7(a) is a plan view illustrating the swing arm 36 with the hollow shaft storage section 133 as a left arm, a right arm 147, the joint portion 125 for connecting the shaft storage section 133 and the right arm 147. A forward extending portion 126 is mounted to the joint portion 125 with the cylindrical housing 112 being mounted to the forward extending portion 126, 127, and the shock absorber lower end supporting bracket 131.

The shaft storage section 133 is a member to be connected at a front end thereof to the transmission 25 (see FIG. 1) via the rubber boot 141 (see FIG. 5), and at a rear end to the gear case 67 (see FIG. 1) on the side of the rear wheel 37 (see FIG. 1).

The right arm 147 is a member to be mounted at the forward extending portion 127 at a front end to the cylindrical housing 112 together with the forward extending portion 126, and supporting an axle of the rear wheel 37 at a rear end.

Figure 7B:
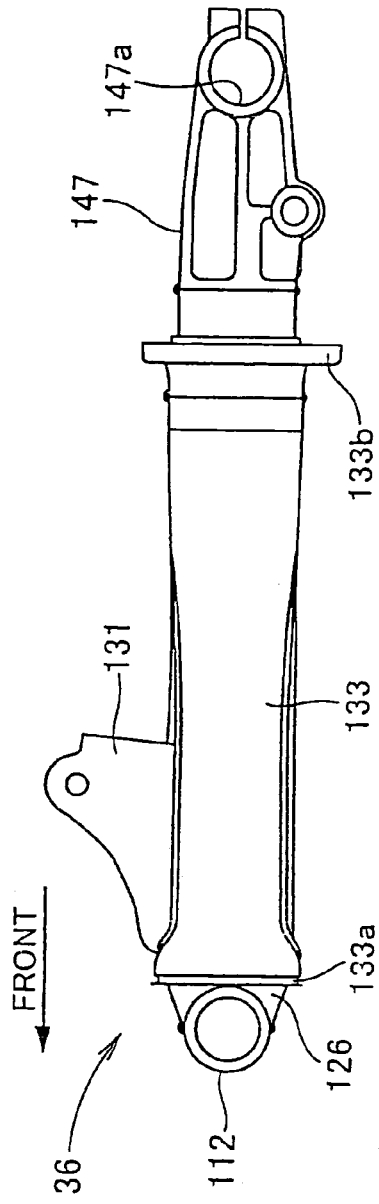

FIG. 7(b) is a side view, and the shaft storage section 133 includes an annular groove 133a for fitting the rubber boot 141 (see FIG. 5) at the front end and a flange portion 133b to be connected to the gear case 67 (see FIG. 1) at the rear end thereof.

The right arm 147 includes a hole 147a for mounting the axle of the rear wheel at the rear end thereof.

An operation of the swing arm supporting structure described above will be described.

Figure 8B:
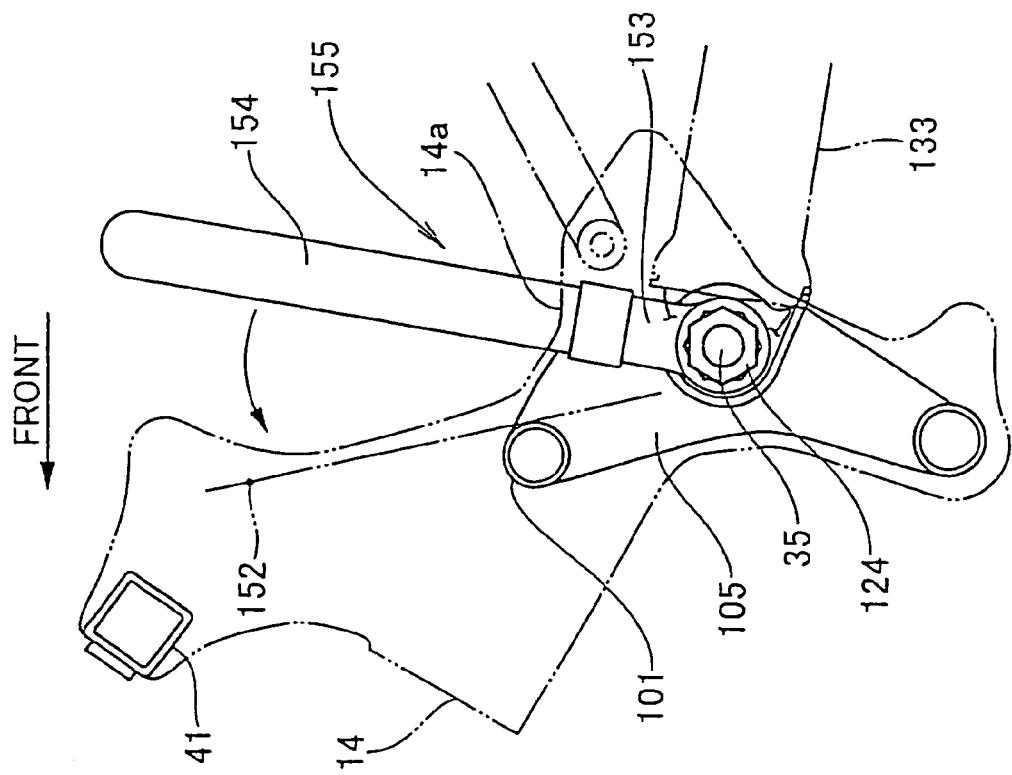
FIGS. 8(a) and 8(b) are operational drawings showing an operation of the swing arm supporting structure according to the present invention.
Figure 8A:
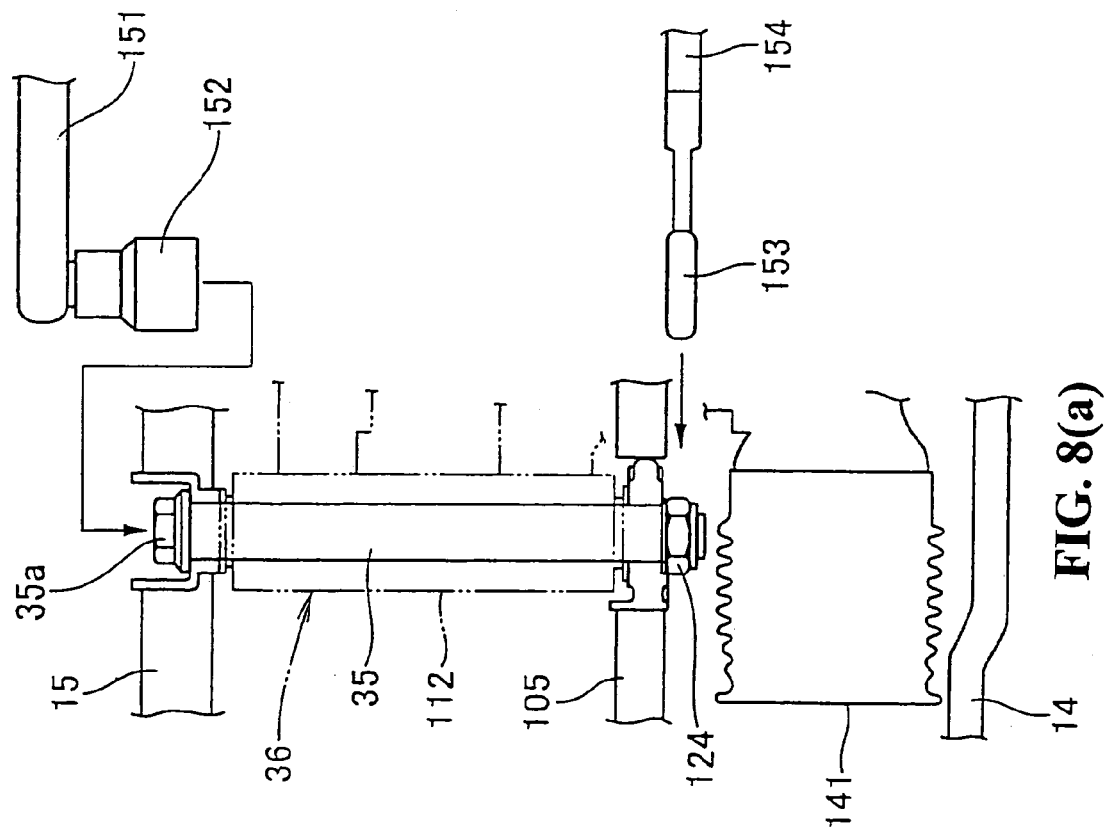

FIGS. 8(a) and 8(b) are operational drawings showing the operation of the swing arm supporting structure according to the present invention.

In FIG. 8(a), for example, in order to remove the pivot shaft 35, a socket wrench 151 (reference numeral 152 designates a socket), and a torque wrench 154 having a glass-type exchanging head 153 are prepared. The socket 152 of the socket wrench 151 is engaged with a head portion 35a of the pivot shaft 35.

In FIG. 8(b), the torque wrench 154 is inserted between the center pivot plate 105 and the rubber boot 141 (see FIG. 8(a)) on the side of the shaft storage section 133 from a space above the pivot shaft 35, that is, from a space 155 defined behind the middle cross pipe 101 with respect to the vehicle by forming the notch 14a on the plate member 14, and is engaged with the nut 124.

In a state wherein the socket wrench 151 (see FIG. 8(a)) is fixed, the torque wrench 154 is rotated in the direction indicated by an arrow. A straight line shown by an imaginary line indicates an edge of the torque wrench 154 before interfering with the middle cross pipe 101.

In this manner, the notch 14a is formed on the plate member 14 above the pivot shaft 35 and the middle cross pipe 101 is arranged above the pivot shaft 35 and forwardly of the pivot shaft 35 with respect to the vehicle body. Further, the upper cross pipe 41 is arranged above the middle cross pipe 101 and forwardly of the middle cross pipe 101 with respect to the vehicle body. Thus, the space 155 facilitates the torque wrench 154 as the tool to be inserted toward the nut 124, and facilitates the torque wrench 154 to be engaged with the nut 124. Therefore, the nut 124 is rotated by pivoting (swinging) the torque wrench 154 engaged with the nut 124 and is positioned above the pivot shaft 35.

Figure 9A:
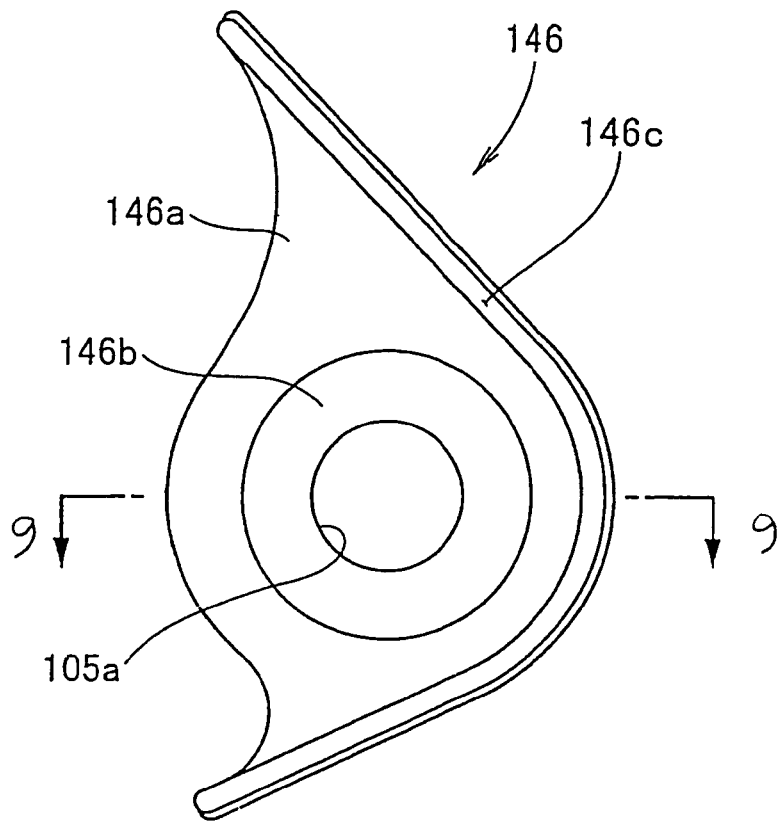
FIGS. 9(a) and 9(b) are explanatory drawings of a shaft supporting member which constitutes the center pivot plate according to the present invention.
Figure 9B:
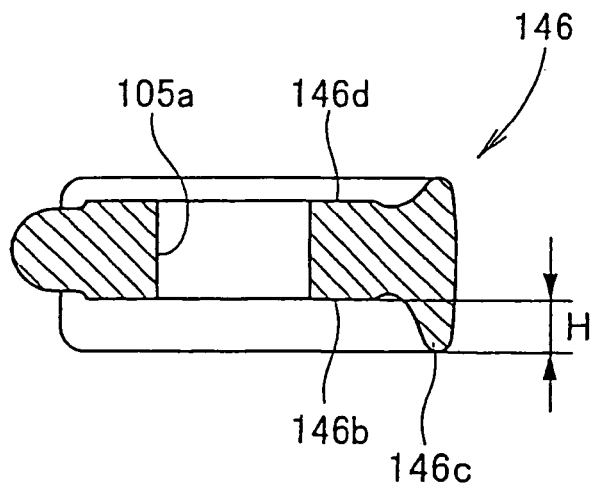

FIGS. 9(a) and 9(b) are explanatory drawing of the shaft supporting member which constitutes the center pivot plate according to the present invention.

FIG. 9(a) is a right side view of the shaft supporting member 146. The shaft supporting member 146 includes a base portion 146a, a supporting surface 146b formed one step higher than the base portion 146a and having the through hole 105a opening therethrough with an upright wall 146c formed integrally with upper and lower edges into a substantially inverted angular C-shape in side view.

The supporting surface 146b is a surface for supporting an end of the swing arm supporting portion 110 (see FIG. 5). More specifically, the collar 117 (see FIG. 5), and the upright wall 146c is a portion for aiding the positioning by receiving the swing arm supporting portion 110 when assembling the swing arm 36 (see FIG. 5).

FIG. 9(b) is a cross-sectional view taken along a line 9-9 in FIG. 9(a) illustrating that the upright wall 146c is formed at a level higher than a height H with respect to the supporting surface 146b. An abutment surface 146d is provided for bringing a washer 142 on the side of the nut 124 (see FIG. 5).

In FIG. 10(b), the ends of the collars 117, 118 of the swing arm supporting portion 110 are moved forwardly of the vehicle along the supporting surface 146b of the center pivot plate 105 and an inner end surface 111b of the cylindrical member 111. The flange portion 117a of the collar 117 of the swing arm supporting portion 110 abuts against the upright wall 146c. At this time, the centerline 149 is shifted forwardly of the vehicle with respect to the centerline 148. Therefore, the swing arm supporting portion 110 is returned toward the rear of the vehicle as shown by a hollow arrow.

FIG. 10(c) shows a state in which the centerline 148 coincides with the centerline 149. In this state, the pivot shaft 35 (see FIG. 5) can be inserted into the hole 111a, the swing arm supporting portion 110, and the through hole 105a.

Figures 11A, 11B, 11C:
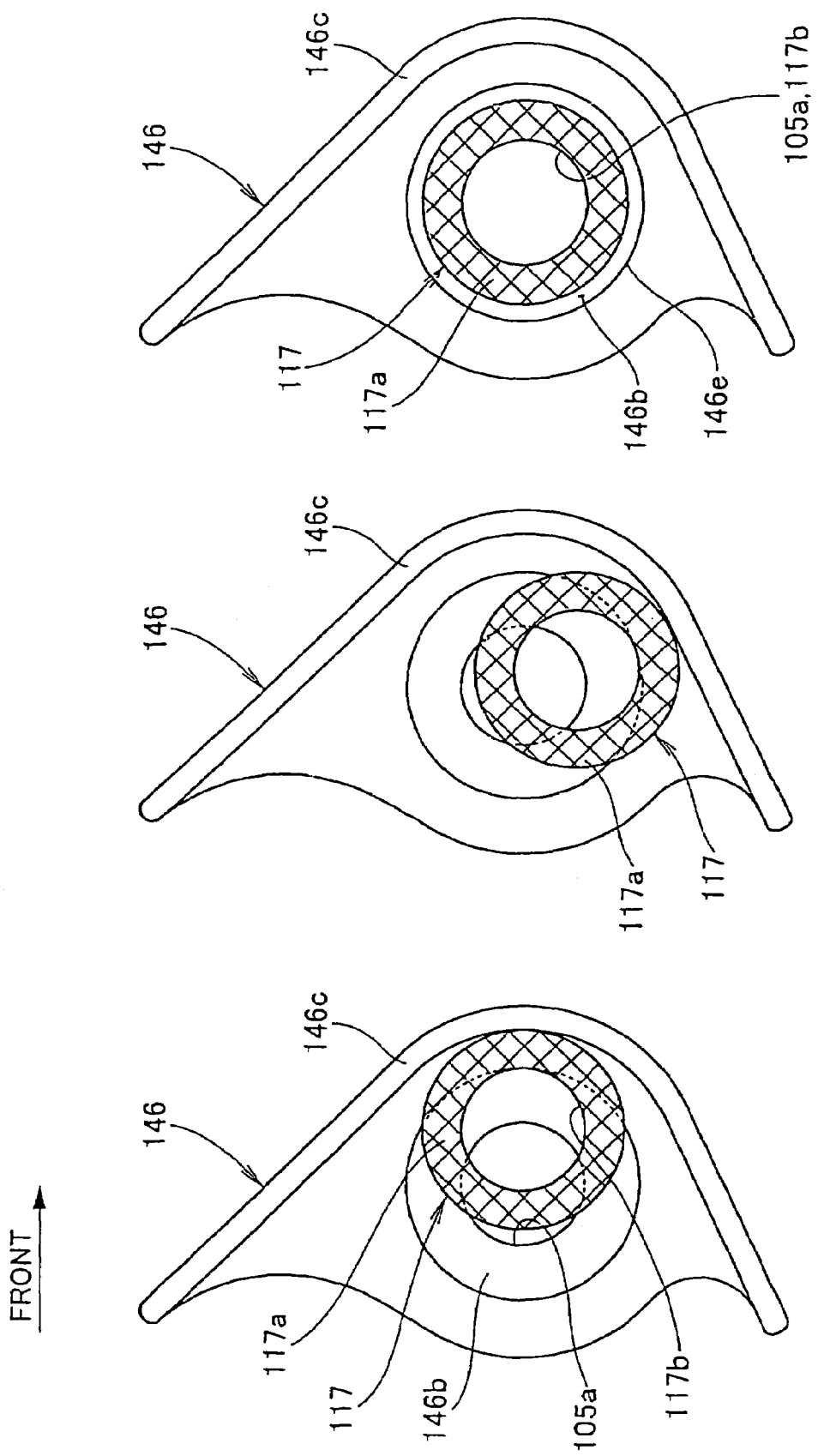
FIGS. 11(a), 11(b) and 11(c) are second operational drawings showing the operation of the swing arm supporting structure according to the present invention.

FIG. 11(a)-(c) are second operational drawings showing the operation of the swing arm supporting structure according to the present invention, and illustrating a positional relation between the shaft supporting member 146 and the collar 117.

FIG. 11(a) illustrates a state in which the flange portion 117a of the collar 117 abuts against the upright wall 146c of the shaft supporting member 146, corresponding to FIG. 10(b).

FIG. 11(b) shows a state in which the collar 117 is moved downwardly along the upright wall 146c from the state shown in FIG. 11(a). At this time, the upright wall 146c supports a part of the weight of the collar 117, and hence the swing arm supporting portion 110 (see FIG. 10(b)). In this manner, by supporting the swing arm supporting portion 110, that is, the front portion of the swing arm 36 (see FIG. 5) with the upright wall 146c, a burden at the time of swing arm assembling operation can be alleviated.

FIG. 11(c) shows a state in which the through hole 105a of the shaft supporting member 146 and the through hole 117b of the collar 117 are aligned, corresponding to FIG. 10(c).

A rough indication for aligning the through hole 117b with the through hole 105a is a contour 146e of the supporting surface 146b of the shaft supporting member 146 which is larger than an outer diameter of the flange portion 117a of the collar 117.

By moving the swing arm supporting portion 110 (see FIG. 9(c)) so that an outer peripheral portion of the collar 117 runs along the contour 146e while looking at the contour 146e, the positioning of the swing arm can be facilitated.

As described in FIG. 3, FIG. 4 and FIG. 5, the present invention is firstly the motorcycle 10 (see FIG. 1) including the arm supporting member 108 provided on a rear portion of the vehicle body frame 11, the swing arm 36 mounted to the arm supporting member 108 via the pivot shaft 35, and the pivot shaft 35 being arranged on the side of the drive shaft 132 for transmitting power to the rear wheel 37 (see FIG. 1) mounted to the rear end of the swing arm 36, more specifically, on side-by-side relation with the joint 138 connected to the drive shaft 132 in the widthwise direction of the vehicle. The arm supporting member 108 includes the pair of left and right plate members 14, 15, the middle cross pipe 101 extending between the plate members 14, 15, and the center pivot plate 105 as the center plate member mounted to the middle cross pipe 101. The pivot shaft 35 is supported by one of the plate members 14, 15 (plate member 15) and the center pivot plate 105, the drive shaft 132 is arranged between the other one (plate member 14) of the plate members 14, 15 and the center pivot plate 105. The middle cross pipe 101 is arranged above the pivot shaft 35 and on the front portion of the vehicle.

Since the middle cross pipe 101 is arranged above the pivot shaft 35 and on the front portion of the vehicle, the space for inserting and pivoting the tool can be defined above the pivot shaft 35. Thus, for example, the nut 124 for mounting the pivot shaft 35 to the center pivot plate 105 can be rotated easily by the offset wrench 154 as the tool, whereby easy mounting and dismounting of the pivot shaft 35 are enabled. Therefore, the entire plate member 14 can be integrated, and hence the numbers of components and process steps are not increased, whereby an increase in cost may be prevented.

In an embodiment of the present invention a plate member 14 is preferably the member formed with the notch 14a by cutting the portion located above the pivot shaft 35.

In an embodiment of the present invention, the upper cross pipe 41 is provided as the rear shock absorber mounting portion provided on the arm supporting member 108 that is preferably arranged above the middle cross pipe 101 and on the front portion of the vehicle body.

Since the portion of the plate member 14 located above the pivot shaft 35 is notched, and then the upper cross pipe 41 provided on the arm supporting member 108 is arranged above the middle cross pipe 101 and on the front portion of the vehicle body, the tool can easily be inserted from above the pivot shaft 35, for example, toward the nut 124, and the tool can easily be engaged with the nut 124. Moreover, the tool can be operated easily for rotating the nut 124, whereby workability is further improved.

In an embodiment of the present invention, the plate member 14 is preferably arranged to the side of the pivot shaft 35 with respect to the vehicle body so as to hide the pivot shaft 35 from the eye.

Since the plate member 14 is arranged on the side of the pivot shaft 35 with respect to the vehicle body so as to hide the pivot shaft 35 from the eye, the plate member 14 has no opening, and hence high rigidity plate member 14 is achieved.

In an embodiment of the present invention, the plate member 14 is preferably mounted integrally with the main frame 13 as the frame member constituting the vehicle body frame 11.

Since the plate member 14 is integrally attached to the rear portion of the main frame 13, the pivot shaft 35 is hidden from the eye by the plate member 14, and by mounting it integrally with the main frame 13. Thus, the rigidity of the plate member 14 can be secured, and hence the entire rigidity of the arm supporting member 108 can be improved.

In the present embodiment, as shown in FIG. 4, although the additional center pivot plate 105 is mounted to the middle cross pipe 101 and the lower cross pipe 102, it is not limited thereto, and the middle cross pipe 101 and the lower cross pipe 102 and the center pivot plate 105 (the entire center pivot plate 105 or only the plate portion 145) may be formed integrally.

As described in FIG. 5 and FIGS. 10(a)-(c), in the motorcycle 10 (see FIG. 2) including the center pivot plate 105 and the plate member 15 as the left and right pivot plates on the vehicle body frame 11, the bearing member 120 is provided at the front end of the swing arm 36 for supporting the rear wheel 37 (see FIG. 2) so as to be capable of swinging in the vertical direction. The bearing member 120 is mounted to the center pivot plate 105 and the plate member 15 via the pivot shaft 35. The bearing member 120, more specifically, the upright wall 146c as the receiving portion is provided on the center pivot plate 105 for aiding the positioning of the bearing member 120 by receiving the collar 117 when assembling the swing arm 36 to the center pivot plate 105 and the plate member 15.

Since the upright wall 146c for aiding the positioning of the bearing member 120 by receiving the bearing member 120 when assembling the swing arm 36 to the center pivot plate 105 and the plate member 15 is provided on the center pivot plates 105, the positioning of the bearing member 120 of the swing arm 36 can be aided by the upright wall 146c. Thus, the swing arm 36 can be assembled easily to the center pivot plate 105 and the plate member 15.

In an embodiment of the present invention, the motorcycle 10 is the shaft-drive type rear-wheel drive vehicle, and the upright wall 146c is provided on the center pivot plate 105 on the side of the drive shaft 132.

Since the upright wall 146c is provided on the center pivot plate 105 on the side of the drive shaft 132, the assembly of the swing arm 36 to the center pivot plate 105 near the center of the vehicle body can be performed easily, whereby the assembleability can be improved.

In an embodiment of the present invention, the upright wall 146c receives the flange portion 117a of the collar 117 provided at the end of the bearing member 120.

Since the upright wall 146c receives the flange portion 117a of the collar 117, the flange portion 117a of the collar 117 can easily be identified even in the narrow gap between the center pivot plate 105 and the cylindrical housing 112 of the bearing member 120. Thus, the positioning of the bearing member 120 can easily be performed.

As shown in FIG. 5 and FIGS. 9(a) and 9(b), the receiving portion is the upright wall 146c extending upright substantially along the pivot shaft 35 and surrounding the end of the pivot shaft 35.

By forming the receiving portion into the upright wall 146c that is integrally formed with the base portion 146a, the receiving portion can be formed without any additional component. Thus, an increase in the number of components can be restrained, and a reduction in the cost is achieved.

In an embodiment of the present invention, the upright wall 146c is provided at least on the front side of the pivot shaft 35 with respect to the vehicle.

Since the upright wall 146c is provided at least on the front side of the pivot shaft 35 with respect to the vehicle, the rear side of the pivot shaft 35 is opened with respect to the vehicle, and the positioning can be aided by bringing the bearing member 120 of the swing arm 36 into abutment with the upright wall 146*c* from the back side of the vehicle, whereby the assembleability of the swing arm 36 from the back side of the vehicle is improved.

By forming the upright wall 146*c* into the inverted C-shape in a side view, the insertion of the collar 117 into the upright wall 146*c* is facilitated, and part of the weight of the bearing member 120. Thus, the front portion of the swing arm 36 can be supported by an inclined section of the lower portion of the upright wall 146*c* via the collar 117, whereby the burden in the time of swing arm assembling operation can be alleviated.

As shown in FIG. 6 and FIG. 7, the center pivot plate 105 is a member including the plate member 145 and the shaft supporting member 146 formed separately from the plate member 145 for forming the upright wall 146*c* combined with respect to each other.

The center pivot plate 105 is the member including the plate member 145 and the shaft supporting member 146 formed separately from the plate member 145 for forming the upright wall 146*c* combined with respect to each other, for example, the shaft supporting member 146 provided with the upright wall 146*c* can be formed of a different material from the plate member 145. Thus, the flexibility of the design of the center pivot plate 105 can be increased.

In the present embodiment, although the upright wall 146*c* is provided on the center pivot plate 105 as shown in FIG. 5, it is not limited thereto, and the upright wall 146*c* may be provided on the plate member 15.

Although the upright wall 146*c* is formed substantially into the inverted angular C-shape in side view when viewed from the right side of the vehicle as shown in FIG. 7(*a*), it is not limited thereto, and the upright wall 146*c* can be formed into the inverted C-shape in side view, or angular C-shape, or the shapes similar thereto.

In addition, as shown in FIG. 10(*b*), although the collar 117 of the bearing member is adapted to abut against the upright wall 146*c*, it is not limited thereto, and one end of the cylindrical housing 112 of the bearing member 120 shown in FIG. 5 is extended so that the cylindrical housing 112 abuts against the upright wall 146*c*.

The swing arm supporting structure of the present invention is preferred for a motorcycle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. In a motorcycle comprising:
   an arm supporting member provided on a rear portion of a vehicle body frame;
   wherein the arm supporting member comprises:
     a first and a second plate member,
     a cross pipe extending between the plate members, and
     a center plate member mounted to the cross pipe, a pivot shaft supported by the first plate member and the center plate member,
   a swing arm mounted to the pivot shaft,
   a drive shaft arranged between the second plate member and the center plate member, and the cross pipe is arranged above the pivot shaft and on a front portion of the vehicle body frame.

2. The motorcycle according to claim 1, wherein the second plate member is a member formed with a notch at a portion located above the pivot shaft.

3. The motorcycle according to claim 1, wherein a rear shock absorber mounting portion provided on the arm supporting member is arranged above the cross pipe and on the front portion of the vehicle body frame.

4. The motorcycle according to claim 2, wherein a rear shock absorber mounting portion provided on the arm supporting member is arranged above the cross pipe and on the front portion of the vehicle body frame.

5. The motorcycle according to claim 1, wherein the second plate member is arranged to a side of the pivot shaft with respect to the vehicle body frame so as to hide the pivot shaft from a side view of the vehicle body frame.

6. The motorcycle according to claim 2, wherein the second plate member is arranged to a side of the pivot shaft with respect to the vehicle body frame so as to hide the pivot shaft from a side view of the vehicle body frame.

7. The motorcycle according to claim 3, wherein the second plate member is arranged to a side of the pivot shaft with respect to the vehicle body frame so as to hide the pivot shaft from a side view of the vehicle body frame.

8. The motorcycle according to claim 1, wherein the second plate member is mounted integrally with a frame member constituting the vehicle body frame.

9. The motorcycle according to claim 2, wherein the second plate member is mounted integrally with a frame member constituting the vehicle body frame.

10. The motorcycle according to claim 3, wherein the second plate member is mounted integrally with a frame member constituting the vehicle body frame.

11. The motorcycle according to claim 5, wherein the second plate member is mounted integrally with a frame member constituting the vehicle body frame.

12. In a motorcycle comprising
   left, center, and right pivot plates on a vehicle body frame,
   a swing arm for supporting a rear wheel,
   a bearing member provided at a front end of the swing arm so as to be capable of swinging in a vertical direction, and the bearing member being mounted to the center pivot plate via a pivot shaft,
   a swing arm supporting structure for a motorcycle comprising:
     a receiving portion provided on the center pivot plate for aiding the positioning of the bearing member by receiving the bearing member when assembling the swing arm to the center pivot plate.

13. The swing arm supporting structure for a motorcycle according to claim 12, wherein the motorcycle is a shaft-drive type rear-wheel drive vehicle and the receiving portion is provided on the center pivot plate on a drive-shaft side.

14. The swing arm supporting structure for a motorcycle according to claim 12, wherein the receiving portion receives a flange portion of a collar provided at an end of the bearing member.

15. The swing arm supporting structure for a motorcycle according to claim 13, wherein the receiving portion receives a flange portion of a collar provided at an end of the bearing member.

16. The swing arm supporting structure for a motorcycle according to claim 12, wherein the receiving portion extends upright substantially along the bearing member and is formed into an upright wall surrounding an end of the bearing member.

17. The swing arm supporting structure for a motorcycle according to claim 13, wherein the receiving portion extends upright substantially along the bearing member and is formed into an upright wall surrounding an end of the bearing member.

18. The swing arm supporting structure for a motorcycle according to claim 12, wherein the receiving portion is provided at least on a front side of the center pivot plate with respect to the vehicle body frame.

19. The swing arm supporting structure for a motorcycle according to claim 12, wherein the center pivot plate is a member including a plate member and a shaft supporting member formed separately from the plate member for forming the receiving portion.

20. The swing arm supporting structure for a motorcycle according to claim 13, wherein the center pivot plate is a member including a plate member and a shaft supporting member formed separately from the plate member for forming the receiving portion.

* * * * *